United States Patent [19]

Malandra et al.

[11] Patent Number: 4,678,623
[45] Date of Patent: Jul. 7, 1987

[54] MODULAR HEAD ASSEMBLY AND METHOD OF RETROFITTING EXISTING NUCLEAR REACTOR FACILITIES

[75] Inventors: Louis J. Malandra, Elizabeth Township, Allegheny County, Pa.; Robert J. Leduc, Columbia, Md.; Michael F. Hankinson, Monroeville; Edward F. Kowalski, Pittsburgh, both of Pa.

[73] Assignee: Westinghouse Electric Corp., Pittsburgh, Pa.

[21] Appl. No.: 576,676

[22] Filed: Feb. 3, 1984

[51] Int. Cl.[4] .................. G21C 19/00; G21C 1/01
[52] U.S. Cl. ................................ 376/260; 376/463
[58] Field of Search ............. 376/463, 263, 262, 260, 376/353, 243, 228

[56] References Cited

U.S. PATENT DOCUMENTS 4,302,290 11/1981 Mazur et al. .................. 376/463 X

FOREIGN PATENT DOCUMENTS 0034094 8/1981 European Pat. Off. .
2036728 12/1970 France .
2100496 12/1982 United Kingdom ............. 376/260

OTHER PUBLICATIONS

Andrews, H. et al., "Rapid Refueling System for Nuclear Plants", *Westinghouse Engineer*, vol. 34, No. 2, Apr. 1974, pp. 53-59.

*Primary Examiner*—Deborah L. Kyle
*Assistant Examiner*—John S. Maples
*Attorney, Agent, or Firm*—Daniel C. Abeles

[57] ABSTRACT

A modular head assembly (110) for a nuclear reactor pressure vessel includes a closure head (112) having control rod drive mechanisms (116) mounted therein and projecting thereabove. Cooling baffles (118) provide air paths for cooling air for the CRDMs (116), and a lower air manifold (120) is fluidically connected to the cooling baffles (118) as well as to vertically upwardly extending air ducts and manifolds (136, 138, 140). Axial flow exhaust fans (126) are fluidically connected to the ducts (140) through means of plenum chambers (162) with the latter mounted upon a missile shield plate (134). The missile shield plate (134) is fixedly mounted upon closure head lift rods (144) as is a seismic support platform (128). The air ducts (140) pass through the seismic support platform (128) and the missile shield plate (134), and a centralized cable connector plate (164), to which all electrical cables from the CRDMS, thermocouples, and control-rod rod-position-indicator coils are routed and connected, is mounted upon the seismic support platform (128) and is interposed between the seismic support platform (128) and the missile shield plate (134). By means of the modular head assembly (110) of the present invention, all of the aforenoted components may be lifted or lowered along with the closure head (112) as one integral unit, all components are physically located within the peripheral envelope of the closure head (112), and existing facilities can be accordingly modified.

18 Claims, 2 Drawing Figures

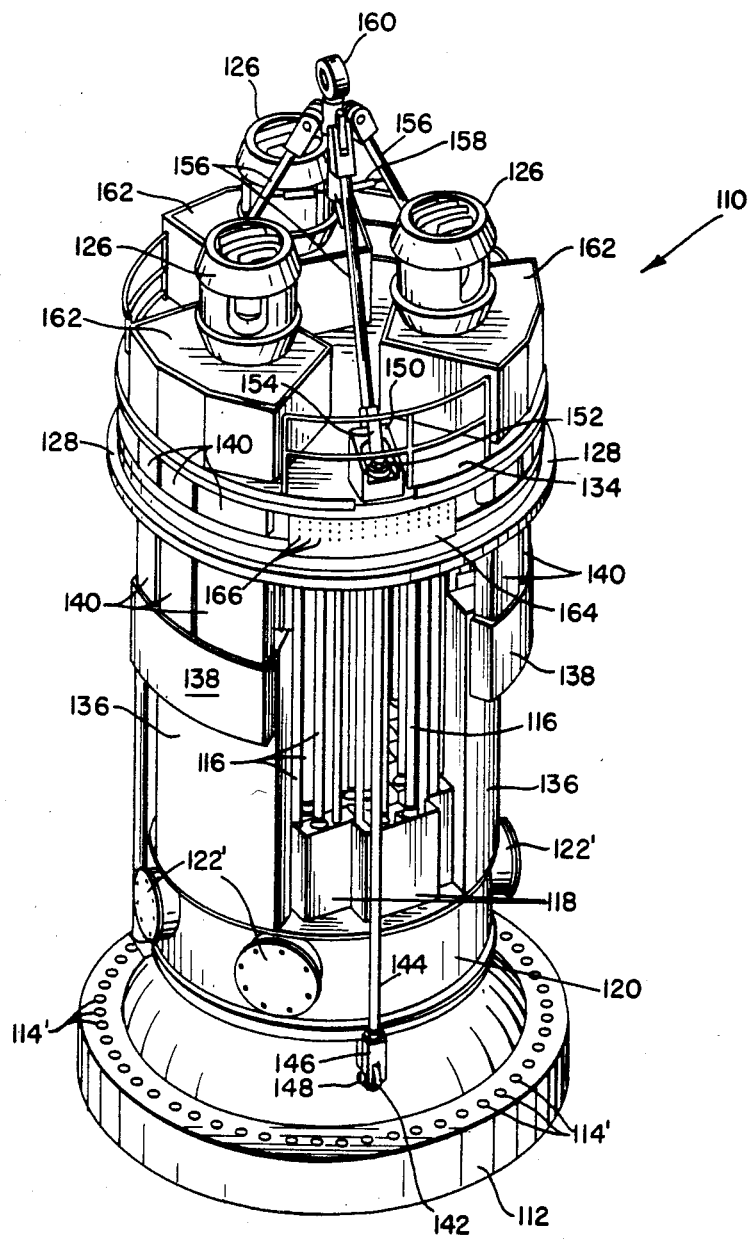

MODULAR HEAD ASSEMBLY AND METHOD OF RETROFITTING EXISTING NUCLEAR REACTOR FACILITIES

BACKGROUND OF THE INVENTION

1. Field of the Invention

The present invention relates generally to nuclear reactor facilities, and more particularly to a new and improved nuclear reactor pressure vessel closure head assembly which is structurally modular, and wherein the structural principles of the same are applicable to existing or current nuclear reactor facilities in accordance with retrofitting techniques, whereby all major components operatively associated with the closure head, such as, for example, the seismic support platform, the missile shield plate, and the CRDM cooling air circulation system, are disposed upon the closure head within the peripheral envelope thereof and may be moved along with the closure head in an integrated manner when the closure head is either being removed from the reactor pressure vessel or installed thereon.

2. Background of the Invention

Analysis of recent refueling operations has effectively demonstrated the fact that removal and installation of the nuclear reactor pressure vessel closure head is one of the most time-consuming phases or procedures of a nuclear reactor refueling operation. This factor may be readily and better appreciated with reference being made to FIG. 1 of the drawings. As illustrated therein, there is shown a conventional nuclear reactor pressure vessel closure head assembly which comprises the reactor pressure vessel closure head 12 which is secured to the nuclear reactor pressure vessel, not shown, by means of the conventional circumferential array of tension bolts or studs 14. Control rod drive mechanism (CRDM) assemblies 16 pass upwardly through, and extend above, the pressure vessel closure head 12, and cooling baffle assemblies 18 are fluidically connected with the CRDM assemblies 16 so as to provide defined flow paths for cooling air to the CRDM coil stack assemblies, not shown. A lower air manifold 20 is annularly disposed about the upper domed portion of the closure head 12 so as to be disposed beneath the CRDM cooling baffle assemblies 18 and to define a fluidic flow-path in connection therewith. A plurality of vertically extending elbowtype air ducts 22 fluidically connect the lower air manifold 20 with an upper air manifold 24 upon the top of which is disposed a pair of axial flow cooling fans 26. Operation of the axial flow cooling fans 26 therefore causes ambient containment air to be introduced into the cooling baffle assemblies 18 so as to be conducted past the CRDM coil stack assemblies thereby cooling the same. The air is then exhausted into the lower air manifold 20, the elbow air flow ducts 22, the upper air manifold 24, and outwardly from the axial flow fans 26.

A seismic support platform 28 is provided at the upper end of the CRDM assemblies 16 for laterally restraining the CRDM assemblies 16 under seismic conditions, and a conventional cable tray bridge, not shown, is pivotably connected to the facility building walls so as to operationally interface with one of a pair of I-beam structural girders 30 which are supported upon the facility building walls 32. The girders are disposed elevationally above the seismic support platform 28 and serve to support a missile shield block 34 which is disposed atop the girders 30. The shield block 34 serves to protect the containment area and the various other operational components of the reactor from the effects, for example, of a failure within one of the CRDM assemblies 16 whereby a drive rod thereof could possibly be hurled outwardly under the pressurized conditions prevailing within the reactor pressure vessel. The upper air manifold 24 of the CRDM coil stack assembly coolant air flow system is noted as being disposed atop the missile shield block 34.

As a result of the aforenoted structural interrelationship defined between the various operational components of the nuclear reactor, it will then be readily appreciated that when a refueling operation is to be performed in connection with the reactor, an excessive number of man-hours is in fact required to complete such operations. This is due, in part, to the fact that in order, for example, to remove the reactor pressure vessel closure head 12 from the reactor pressure vessel, not shown, a lifting rig or hoist system must be initially installed or affixed to the closure head 12, however, such a lifting or hoisting system cannot even be so attached or affixed to the closure head 12, because of the absence of accessible or available space accommodations, until some of the closure head components are first removed. In particular, for example, the upper air manifold 24, the axial flow cooling fans 26, and the associated elbow air ducts 22 must all be removed. Such removal operations may then be subsequently followed by removal of the missile shield block 34 and the I-beam support girders 30 therefor. A lifting rig and lift rod assemblies may then be installed upon the closure head 12 so as to in fact remove the same from the pressure vessel, not shown, provided, of course, that the closure head tension bolts or studs 14 have been previously de-tensioned and removed. In addition, it was additionally considerably time-consuming to disconnect all of the electrical connections for the individual CRDM power and rod position indicator (RPI) coil assemblies in view of the fact that all of such connections have to be individually disconnected or broken at the sites or locations of all the CRDM assemblies 16 disposed about the closure head 12. In a similar manner, all of the aforenoted procedures attendant the preparation of the reactor for institution of the refueling operations must of course be repeated, in a substantially reverse mode of operation, upon completion of the refueling operations and preparation of the reactor for commencement of normal operations.

An additional time-related factor to also be considered in connection with such conventional reactor facilities, and the drawbacks or operational disadvantages thereof in connection with the performance of refueling operations therefor, is the considerably excessive amount of radiation that the maintenance personnel will tend to be exposed to in view of the considerable amount of time they must spend residing within the vicinity of the closure head 12 during performance of the various aforenoted operations in preparation for, or upon completion of, the refueling operations.

Accordingly, it is an object of the present invention to provide a new and improved nuclear reactor pressure vessel modular closure head assembly.

Another object of the present invention is to provide a new and iproved nuclear reactor pressure vessel modular closure head assembly which can effectively overcome the various operational disadvantages and drawbacks characteristic of conventional nuclear reactor pressure vessel closure head assemblies.

Still another object of the present invention is to provide a new and improved nuclear reactor pressure vessel modular closure head assembly wherein the structural principles thereof are simply applicable or adaptable to conventionally existing nuclear reactor pressure vessel closure head assemblies whereby such conventionally existing closure head assemblies may be modified in accordance with retrofitting techniques.

Yet another object of the present invention is to provide a new and improved nuclear reactor pressure vessel modular closure head assembly wherein all major components operatively associated with the closure head are disposed upon the closure head within the peripheral envelope thereof.

Still yet another object of the present invention is to provide a new and improved nuclear reactor pressure vessel modular closure head assembly wherein all major components operatively associated with the closure head are movable with the closure head in an integrated manner when the closure head is either being removed from, or installed upon, the reactor pressure vessel.

Yet still another object of the present invention is to provide a new and improved nuclear reactor pressure vessel modular closure head assembly wherein the lift rig, tripod sling, and lift rod assemblies are permanently secured to the closure head assembly whereby removal and installation operations for the closure head relative to the pressure vessel can be simply accomplished without removal or dismantling of various operational components associated with the pressure vessel closure head.

A further object of the present invention is to provide a new and improved nuclear reactor pressure vessel modular closure head assembly which substantially reduces the refueling operation time normally required for performance of the refueling cycle, and which is therefore extremely cost-effective.

A yet further object of the present invention is to provide a new and improved nuclear reactor pressure vessel modular closure head assembly which substantially reduces the time required for performance of the refueling operations, particularly the time required for removal and installation of the pressure vessel closure head relative to the pressure vessel, whereby radiation exposure time by means of the maintenance personnel, is reduced substantially.

SUMMARY OF THE INVENTION

The foregoing and other objectives are achieved in accordance with the present invention through the provision of a new and improved nuclear reactor pressure vessel modular closure head assembly which comprises the elimination of the vertically extending elbow-type air ducts, as well as the missile shield block and its supporting girders. In lieu of such structural components and their particular relative disposition with respect to the nuclear reactor pressure vessel closure head, the exhaust ports defined within the lower air manifold chamber are capped or covered, and vertically extending air duct manifolds are fluidically connected with the lower air manifold chamber. A seismic support platform is fixedly secured to upper regions of three, vertically extending, circumferentially spaced lift rods, and the seismic support platform is provided with suitably configured apertures so as to permit the air duct manifolds to pass vertically therethrough. Alternatively, the air duct manifolds can comprise upper and lower sections mated with the seismic support platform whereby the seismic support platform apertures serve as air flowthrough ducts or conduits.

A missile shield plate is vertically spaced above the seismic support platform and is fixedly secured to the upper ends of the lift rods. Air plenums are fixedly secured atop the missile shield plate, and three axial flow cooling fans are respectively disposed atop the air plenums, the fans actually being supported upon the missile shield plate. Suitable apertures are defined within the missile shield plate in a manner similar to those defined within the seismic support platform so as to fluidically connect the air duct manifolds with the air plenums and the axial flow cooling fans. Load support blocks are fixedly bolted to the missile shield plate for providing the connection means between the missile shield plate and the lift rods, and, in turn, a lift rig and tripod assembly is pinned to each of the load support blocks. It may thus be appreciated that the air cooling system for the CRDM assemblies has been completely modified with respect to existing air cooling and ducting systems whereby, in accordance with the teachings of the present invention, the entire air cooling system is encompassed within the circumferential envelope of the nuclear reactor pressure vessel closure head, and is a permanent or integral part of the entire nuclear reactor pressure vessel closure head modular assembly.

In accordance with another particularly unique feature of the present invention, a cable connector plate is mounted upon the seismic support platform and interposed between the seismic support platform and the missile shield plate. By means of the cable connector plate, quick-disconnect-connect electrical connectors may be fixedly disposed within the connector plate so as to provide quick connection means for the CRDM power and RPI coil cables, as well as, for example, the thermocouple electrical cables. This structural system drastically improves the conventional system wherein the electrical disconnects were located at each individual site or location corresponding to the particular structural component with which the particular electrical cable and connector was associated. This centralized location for all cable connections will be quite cost-effective in time-savings as compared to the conventional systems, and serves to additionally improve the time-saving cost-effectiveness of the entire modular head assembly as also dictated by the fact that in view of the permanent fixation of the lift rig and tripod assembly, as well as the permanent fixation of the missile shield plate and the CRDM cooling system, time is not required nor wasted in the erection or dismantling of the various nuclear reactor pressure vessel closure head structural components.

BRIEF DESCRIPTION OF THE DRAWINGS

Various other objects, features, and attendant advantages of the present invention will be more fully appreciated as the same becomes better understood from the following detailed description when considered in connection with the accompanying drawings, in which like reference characters designate like or corresponding parts throughout the several views, and wherein:

FIG. 2 is a perspective view of the new and improved nuclear reactor pressure vessel modular closure head assembly constructed in accordance with the present invention and showing the cooperative parts thereof.

DESCRIPTION OF THE PREFERRED EMBODIMENT

Figure 1:
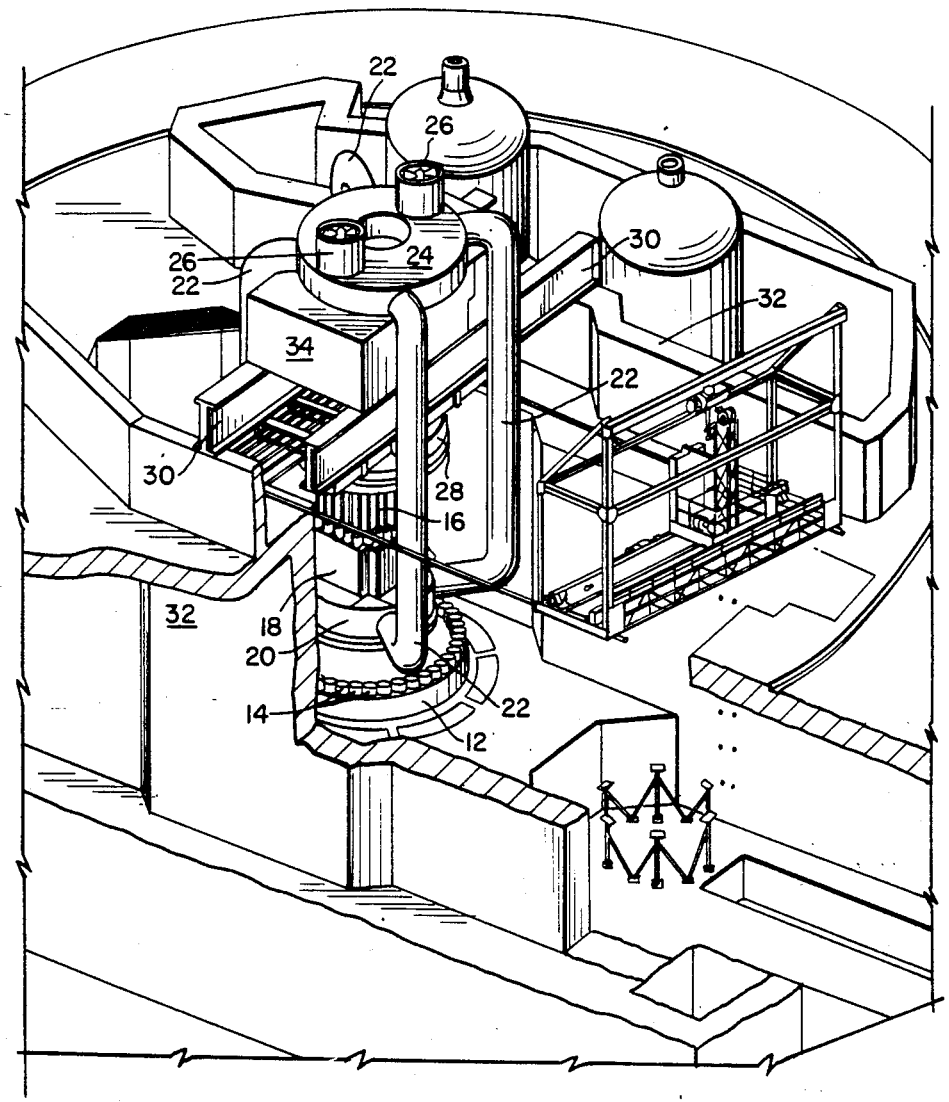
FIG. 1 is a perspective view of a conventional nuclear reactor pressure vessel closure head assembly and the various operational components associated therewith.

Referring now to the drawings, and more particularly to FIG. 2 thereof, there is shown the new and improved nuclear reactor pressure vessel modular closure head assembly constructed in accordance with the present invention and generally indicated by the reference character 110. It is to be noted at this juncture that several of the structural components of the modular head assembly 110 of the present invention as disclosed within FIG. 2 will be similar to, or correspond with, various components of the conventional nuclear reactor pressure vessel closure head assembly of FIG. 1, and consequently, such similar or corresponding components have been denoted with the same reference characters, except that those of the present invention as embodied within FIG. 2 will be numbered within the 100 series.

Continuing, then, the modular head assembly 110 of the present invention is seen to comprise a nuclear reactor pressure vessel closure head 112 within which there is provided a circumferential array of bores 114' at the periphery thereof within which tension bolt fasteners or studs, not shown, are adapted to be disposed for securing the closure head 112 upon the reactor pressure vessel, not shown. Within the upper domed central region of the closure head 112, there is provided an array of control rod drive mechanisms (CRDMs) 116 which project vertically above the domed region of the closure head 112 and also pass downwardly therethrough for defining driving connections with the reactor core control rods. Cooling baffle assemblies or shrouds 118 peripherally surround the entire array of centrally located CRDM assemblies 116 so as to thereby define cooling air flow paths relative to the CRDM assemblies 116 for providing cooling air to the CRDM coil stack assemblies, not shown. The cooling baffle assemblies 118 are open to the ambient containment air at three, equiangularly, circumferentially spaced locations, and are disposed atop a cylindrically configured lower air manifold 120. Suitable apertures are defined within the upper surface of the manifold 120 at locations corresponding to those of the baffle assemblies 118, and in this manner, the baffles 118 will be fluidically connected to the lower air manifold 120. It will be noted that when the modular head assembly 110 of the present invention is compared to the conventional system of FIG. 1, it is apparent that the vertically extending elbow type air ducts 22 have been eliminated or removed, and their respective exhaust ports capped or covered by means of lower air manifold covers 122'.

Vertically extending exhaust air ducts 136 are disposed atop the lower air manifold 120 at three, equiangularly, circumferentially spaced locations interposed between the open locations of the CRDM cooling baffle assemblies 118, with suitable apertures, not shown, being provided within the upper surface of the lower air manifold 120 so as to provide fluidic communication between manifold 120 and the air ducts 136. The upper end of each exhaust air duct 136 is fluidically connected with an upper air duct manifold 138 which is disposed radially outwardly of each exhaust air duct 136, and in turn, each upper air duct manifold 138 is fluidically connected with three vertically extending fan ducts 140. While three fan ducts 140 are illustrated within the embodiment of FIG. 2, it is to be noted that a single duct operatively interfacing with upper air duct manifold 138 is likewise viable.

The nuclear reactor pressure vessel closure head 112 is conventionally provided with three, equiangularly, circumferentially spaced lifting lugs 142 to which are permanently attached, in accordance with the present invention, three vertically extending lift rods 144 by means of clevis 146 and transversely extending pin 148 assemblies. The lift rods 144, as will become more apparent hereinbelow, form an integral part of the closure head lifting or hoisting assembly whereby the closure head 112 and all of its associated operative components and systems can be removed from the reactor pressure vessel to a storage position, not shown, for facilitating performance of the refueling operations, as well as re-installed upon the pressure vessel upon completion of the refueling operations. A seismic support platform 128, which is in the form of an annular, plate-type disc, is fixedly secured within the peripheral region thereof to upper regions of the three vertically extending lift rods 144. As is well known, a seismic support platform provides lateral restraint for the CRDM assemblies 116 so as to prevent swaying or deflections thereof under, for example, seismic conditions, and tie rods, not shown are secured between the seismic support platform 128 and the facility containment building walls. Vertically spaced above the seismic support platform 128 and fixedly secured to the upper ends of the lift rods 144, there is disposed a missile shield 134 which is fabricated in the form of a flat circular plate. In particular, three, equiangularly spaced support blocks 150 are arranged in a circumferential array upon the upper surface of missile shield plate 134 and are adapted to be fixedly bolted thereto. The lift rods 144 project upwardly through the missile shield plate 134 and the support blocks 150 thereof, and are adapted to be fixedly bolted to the support blocks 150 by means of suitable lock nuts 152. In turn, the support blocks 150 are each provided with laterally spaced, radially inward sidewalls between which clevis assemblies 154 of a tripod support system 156 are respectively disposed, transversely disposed pins, not shown, securing the clevis assemblies 154 within the support blocks 150. A spreader bar system 158 has arms fixedly secured to each of the legs of the tripod support system 156 in order to retain the dispositional geometry of the legs of the tripod support system 156 in their operative mode and prevent any collapsing of the same during installation or removal of the tripod support system 156 upon the support blocks 150. A lift rig 160 is affixed atop the apex of the tripod support system 156, whereby a suitable hoisting or lifting hook, not shown, of a hoisting crane, for example, may be secured for suspendingly supporting the entire nuclear reactor pressure vessel modular closure head assembly 110 of the present invention when the assembly 110 is either being elevated for removal from the pressure vessel or being lowered for re-installation upon the pressure vessel, not shown. It may thus be appreciated at this juncture that in accordance with one unique feature of the present invention, the entire hoist and support system for the nuclear reactor pressure vessel modular closure head assembly 110 of the present invention is able to be permanently affixed to the closure head 112 without requiring any dismantling or erection of the hoist and support system comprising the lift rods 144, the tripod support system 156, and the lift rig 160. Consequently, substantial savings in manhour time is achieved, which is of course ultimately reflected in total time saved during which the reactor facility would normally be shut down and out of operation. In addition, there is the additional advantage of substantially limiting the amount of time during which maintenance personnel would normally or otherwise be subjected to radiation exposure.

Continuing further, it is seen that the vertically extending fan ducts 140 project above the seismic support platform 128 so as to be interposed between the seismic support platform 128 and the missile shield plate 134. In order to accommodate this particular disposition of the fan ducts 140, the seismic support platform 128 is provided with suitable apertures, not shown, through which the fan ducts 140 can pass, or alternatively, the fan ducts 140 can be effectively split into vertical sections with the lower section simply being sealingly secured to the undersurface of the seismic support platform 128 while the upper sections of the fan ducts 140 are similarly sealingly secured to the upper surface of the seismic support platform 128, the seismic support platform apertures therefore merely serving to fluidically connect the upper and lower fan duct sections. Three air plenum housings 162 are fixedly disposed atop the upper surface of the missile shield plate 134 so as to be disposed at circumferential positions corresponding to those of the fan ducts 140, and in order to fluidically connect the air plenums 162 and the fan ducts 140, suitable apertures or ports, not shown, are defined within the missile shield plate 134. In turn, three, axial flow cooling fans 126 are respectively disposed atop each of the air plenum housings 162. Suitable apertures or exhaust ports, not shown, are provided within the upper surfaces of the plenum housings 162 so as to provide fluidic communication between the plenum housings and the fans 126. In this manner, it may be appreciated that when the fans 126 are in operation, ambient containment air is sucked into the interior region of the CRDM assemblies 116 through means of the open areas defined between the vertically oriented exhaust air ducts 136 and is conducted downwardly passed the CRDM cooling baffle assemblies 118 and into the lower air manifold 120. The air is then conducted vertically upwardly through means of the exhaust air ducts 136, the upper air duct manifolds 138, the fan ducts 140, the air plenum housings 162, and out from the exhaust fans 126. It is to be noted that while three axial flow cooling exhaust fans 126 are disclosed as being disposed atop their respective air plenums 162, during operation, only two of the fans 126 are actually employed with the third fan remaining idle in a standby capacity in the event that one of the previously operating fans 126 should experience a malfunction. With two of the fans 126 operating, sufficient air intake is achieved throughout the CRDM assemblies 116 as a result of the fluidic communication between the fans 126 and the lower air manifold 120, and once the cooling air has entered the manifold 120, the same can be exhausted through means of the flow paths fluidically connected to the two operating fans 126. Each fan 126 may be equipped with a suitable microswitch assembly, not shown, whereby an indication may be obtained whether or not a particular fan 126 is in fact operating. As may thus be appreciated in connection with the cooling system of the present invention, in a manner similar to that of the lifting or hoisting system previously discussed, the entire cooling system of the present invention is adapted to be permanently attached as an integral part of the nuclear reactor pressure vessel modular closure head assembly 110 without the requirement of dismantling or erecting structural components of the head assembly as was required in connection with conventional systems as disclosed in FIG. 1. In addition, the entire air cooling assembly obviously does not at all interfere with the disposition and operation of the aforenoted lifting system of the present invention whereby, again, both systems can in fact be accommodated in a permanent manner upon the closure head 112. Still further, it is additionally noted that the air cooling system has all of its structural components disposed radially inwardly of the envelope of the closure head 112, or in other words, radially within an imaginary cylindrical tube extending upwardly from the closure head 112 and having an outside diameter the same as that of closure head 112. This is quite important in view of the fact that when the cooling system components are in fact disposed within the envelope of the closure head 112, and particularly further, within the radial extent of the flattened flanged portion of the closure head 112 within which the tension bolt or stud bores 114' are defined, the cooling system components will therefore not interfere with the tension bolt or stud hydraulic tensioning apparatus or equipment, not shown, which is normally suspended from the seismic support platform 128. Another reason why it is important that the cooling components are within the envelope of the closure head 112 resides in the fact that no interference is likewise presented with respect to other structural components within the containment area when, for example, the closure head 112 is removed from the pressure vessel and moved to a storage position during performance of the refueling operations. It is lastly to be noted that while the fans 126 are disclosed as being physically located atop the plenum chambers 162, the fans 126 are actually affixed to the missile shield plate 134 such that the considerable weight of the fan assemblies may be adequately supported.

In connection with a last unique and novel feature of the present invention, in lieu of having to cope with the extremely time-consuming and tedious process of disconnecting each CRDM power cable, CRDM rod position indicator (RPI) cable, and reactor water coolant thermocouple cable from its associated connector at each individual location throughout the entire reactor, there is provided in accordance with the present invention, a centralized location for all of such power and signal transmission cables whereby the cables may be disconnected at such central location with considerable time being saved by not having to have personnel dispatched to each cable location when the cables are desired to be disconnected in preparation for removal of the closure head 112 from the reactor pressure vessel in preparation for commencement of the refueling operations, or alternatively, when the cables are to be re-connected upon completion of the refueling operation. In particular, then, a cable connector plate 164 is fixedly mounted upon the seismic support platform 128 and is provided with a rectangular array of electrical connectors 166 to which, for example, the CRDM power cables, the RPI power and signal cables, and the thermocouple power and signal cables, not shown, may be attached from the internal side thereof. In a similar manner, other cables leading to a conventional cable tray bridge, not shown, pivotably mounted upon the reactor facility building wall at an appropriately accessible location relative to connector plate 164, will be electrically mated with the the connectors 166 of connector plate 164 from the external side thereof. The externally connected cables supported within the cable tray bridge are of course adapted to be routed to a suitable control room within the reactor facility, within which suitable terminal boxes are located.

Thus, it may be seen that the present invention provides many advantages over prior art nuclear reactor pressure vessel closure head systems or assemblies. It is to be noted that in addition to the aforenoted advantages of incorporating the air cooling system and the lifting or hoisting system into an integral assembly along with the closure head 112 whereby all of the components of the entire modular head assembly 110 can be removed from or installed upon the pressure vessel as one integrated unit, it is also to be recognized that in accordance with the present invention, should access to the CRDM assemblies 116 be required for maintenance, repair, or the like, the lift rig 160 and tripod support assembly 156 can be simply removed along with the missile shield plate 134, axial flow fans 126, and plenum chambers 162 by simply disconnecting the missile shield plate 134 from the lift rods 144 as a result of nut assemblies 152, whereby such access is provided.

Lastly, it is likewise to be recognized that in accordance with the principles of the present invention nuclear reactor pressure vessel modular closure head assembly 110, existing nuclear reactor facilities can be modified in accordance with retrofitting techniques. The elbow type air ducts 22 as shown in the embodiment of FIG. 1 can, for example, be removed and the exhaust ports of the lower air manifold 20 can be covered or capped by means of lower air manifold covers 122'. The elimination of the cooling system elbow ducts 22 permits the installation of the lift rods 144 upon the closure head 12 once the conventional missile shield block 34 and the upper air manifold 24 have been removed. The exhaust air ducts 136, the upper air duct manifolds 138, the fan ducts 140, and the air plenum chambers 162 can be subsequently installed along with the missle shield plate 134, and of course, the suitable apertures defined within the various components, such as, for example, the lower air mainfold 120, the seismic support platform 128, and the missle shield plate 134, must be provided so as to define the fluid flow paths for the cooling air. The axial flow fans 126 will of course be disposed atop the plenum chambers 162 and secured to the missile shield plate 134, and the lift rig 160 and tripod assembly 156 will be attached to the missile shield plate blocks 150. The connector plate 164, with its electrical connectors 166, can be added to the assembly and suitably mated with the various power and signal cables.

Obviously, many modifications and variations of the present invention are possible in light of the above teachings. It is therefore to be understood that within the scope of the appended claims, the present invention may be practiced otherwise than as specifically described herein.

We claim:

1. A method of retrofitting existing nuclear reactor facilities so as to form a modular closure head assembly for a nuclear reactor pressure vessel, wherein said existing nuclear reactor facilities comprise control rod drive mechanism cooling systems which include vertically extending elbow air ducts interconnecting vertically spaced upper and lower air manifolds, wherein said elbow air ducts extend radially beyond the peripheral envelope of said closure head, comprising the steps of:
   removing said upper air manifold;
   removing said vertically extending elbow air ducts;
   capping the air ports of said lower air manifold which ports were previously fluidically connecting said lower air manifold to said vertically extending elbow air ducts;
   disposing vertically upwardly extending air exhaust ducts above said lower air manifold in such a manner that said air exhaust ducts are disposed within said peripheral envelope of said closure head;
   fluidically connecting exhaust fans to the upper regions of said air exhaust ducts;
   fluidically connecting said lower regions of said air exhaust ducts to said lower air manifold;
   permanently securing lift rods to said closure head at positions disposed radially outwardly of said lower air manifold;
   attaching a seismic support platform to said lift rods;
   providing fluidic passage of said vertically extending air exhaust ducts through said seismic support platform;
   attaching a missile shield plate to said lift rods; and
   providing fluidic passage of said vertically extending air exhaust ducts through said missile shield plate.

2. A method as set forth in claim 1 further comprising:
   attaching a lifting rig to said lift rods, wherein said lift rig is adapted to be connected to hoisting apparatus for lifting or lowering said closure head,
   whereby when said closure head is lifted or lowered, said closure head, said vertically extending air exhaust ducts, said seismic support platform, said missile shield plate, and said exhaust fans may all be lifted or lowered relative to said pressure vessel as one integral unit.

3. A modular head assembly for a nuclear reactor, comprising:
   a closure head adapted to be fixedly secured atop a nuclear reactor pressure vessel;
   a plurality of control rod drive mechanism (CRDMs) fixedly mounted within said closure head so as to project vertically upwardly above said closure head;
   a plurality of lift rods fixedly secured to said closure head for enabling lifting and lowering of said closure head relative to said pressure vessel;
   a seismic support platform, in the form of an annular plate-like disc, fixedly supported upon said lift rods;
   a missile shield plate, in the form of a flat circular plate, vertically spaced above said seismic support platform, fixedly supported upon said lift rods;
   cooling baffle means operatively associated with said control rod drive mechanisms for defining coolant air flow paths for said control rod drive mechanisms; and
   flow conduit means, fluidically connected to said cooling baffle means, comprising a lower air manifold disposed vertically below said cooling baffle means and interposed between said cooling baffle means and said closure head, and duct means extending vertically upwardly from said lower air manifold, said vertically extending duct means passing through said seismic support platform, and exhaust fan means, disposed atop said vertically upwardly extending duct means, fluidically connected to said flow conduit means, mounted upon said closure head and disposed entirely within the peripheral envelope of said closure head, for causing said coolant air to flow through said coolant air flow paths past said control rod drive mechanisms so as to cool said control rod drive mechanisms and to be exhausted outwardly from said modular head assembly.

4. A modular head assembly as set forth in claim 1, further comprising:

a cable connector plate disposed within said space defined between said seismic support platform and said missile shield plate to which electrical cables from all of said control rod drive mechanisms may be centrally connected.

5. A modular head assembly as set forth in claim 1, wherein:

said exhaust fan means are fixedly secured to said missile shield plate.

6. A modular head assembly as set forth in claim 1, wherein:

said exhaust fan means comprises three axial-flow type exhaust fans disposed in an equiangularly spaced circumferential array about the axis of said closure head.

7. A modular head assembly as set forth in claim 1, further comprising:

a lift rig fixedly secured to said plurality of lift rods for connection to hoisting apparatus for enabling lifting or lowering of said closure head relative to said pressure vessel.

8. A modular head assembly as set forth in claim 1, wherein:

said seismic support platform has a radial extent which is less than that of said closure head whereby said seismic support platform is disposed entirely within said peripheral envelope of said closure head.

9. A modular head assembly as set forth in claim 1, wherein:

said missile shield plate has a radial extent which is less than that of said closure head whereby said missile shield plate is disposed entirely within said peripheral envelope of said closure head.

10. A modular head assembly for a nuclear reactor, comprising:

a closure head adapted to be fixedly secured atop a nuclear reactor pressure vessel;

a plurality of control rod drive mechanisms (CRDMs) fixedly mounted within said closure head so as to project vertically upwardly above said closure head;

a plurality of lift rods fixedly secured to said closure head for enabling lifting and lowering of said closure head relative to said pressure vessel;

a seismic support platform, in the form of an annular plate-like disc, fixedly supported upon said lift rods;

a missile shield plate, in the form of a flat circular plate, vertically spaced above said seismic support plarform, fixedly supported upon said lift rods;

cooling baffle means operatively associated with said control rod drive mechanisms for defining coolant air flow paths for said control rod drive mechanisms; and flow conduit means fluidically connected to said cooling baffle means, comprising a lower air manifold disposed vertically below said cooling baffle means and interposed between said cooling baffle means and said closure head, and duct means extending vertically upwardly from said lower air manifold, said vertically extending duct means passing through said missile shield plate, and exhaust fan means disposed atop said vertically upwardly extending duct means, connected to said flow conduit means, mounted upon said closure head and disposed entirely within the peripheral envelope of said closure head, for causing said coolant air to flow through said coolant air flow paths past said control rod drive mechanisms so as to cool said control rod drive mechanisms and to be exhausted outwardly from said modular head assembly.

11. A modular head assembly as set forth in claim 10, further comprising:

a cable connector plate disposed within said space defined between said support platform and said missile shield plate to which electrical cables from all of said control rod drive mechanisms centrally connected.

12. A modular head assembly as set forth in claim 10, wherein:

said exhaust fan means are fixedly secured to said missile shield plate.

13. A modular head assembly as set forth in claim 10, wherein:

said exhaust fan means comprises three axial-flow type exhaust fans disposed in an equiangularly spaced circumferential array about the axis of said closure head.

14. A modular head assembly as set forth in claim 10, further comprising:

a lift rig fixedly secured to said plurality of lift rods for connection to hoisting apparatus for enabling lifting or lowering of said closure head relative to said pressure vessel.

15. A modular head assembly as set forth in claim 10, wherein:

said seismic support platform has a radial extent which is less than that of said closure head whereby said seismic support platform is disposed entirely within said peripheral envelope of said closure head.

16. A modular head assembly as set forth in claim 10, wherein:

said missile shield plate has a radial extent which is less than that of said closure head whereby said missile shield plate is disposed entirely within said peripheral envelope of said closure head.

17. A modular head assembly for a nuclear reactor, comprising:

a closure head adapted to be fixedly secured atop a nuclear reactor pressure vessel;

a plurality of control rod drive mechanisms (CRDMs) fixedly mounted within said closure head so as to project vertically upwardly above said closure head;

a plurality of lift rods fixedly secured to said closure head for enabling lifting and lowering of said closure head relative to said pressure vessel;

a seismic support platform, in the form of an annular plate-like disc, fixedly supported upon said lift rods;

a missile shield plate, in the form of a flat circular plate, vertically spaced above said seismic support platform, fixedly supported upon said lift rods;

cooling baffle means operatively associated with said control rod drive mechanisms for defining coolant air flow paths for said control rod drive mechanisms; and flow control means fluidically connected to said cooling baffle means, comprising a lower air manifold disposed vertically below said cooling baffle means and interposed between said cooling baffle means and said closure head, and duct means extending vertically upwardly from said lower air manifold, said vertically extending duct means passing through both said seismic support platform and said missile sheild plate, and exhaust fan means disposed atop said vertically upwardly extending duct means, connected to said flow conduit means, mounted upon said closure head and disposed entirely within the peripheral envelope of said closure head, for causing said coolant air to flow through said coolant air flow paths past said control rod drive mechanisms so as to cool said control rod drive mechanisms and to be exhausted outwardly from said modular head assembly.

18. A modular head assembly as set forth in claim 17 wherein:

the radial extent of said vertically extending duct means, said seismic support platform, and said missile shield plate is less than the radial extent of said closure head whereby said vertically extending duct means, said seismic support platform, and said missile shield plate are all disposed internally within the peripheral envelope of said closure head.

* * * * *